(No Model.)
J. H. BLEOO.
RACEWAY FOR ELECTRICAL CONDUCTORS.
No. 586,282. Patented July 13, 1897.
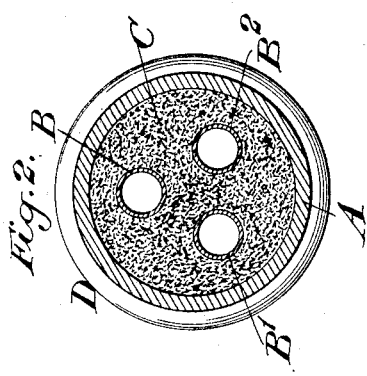
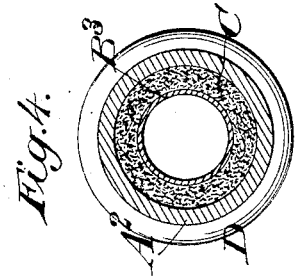
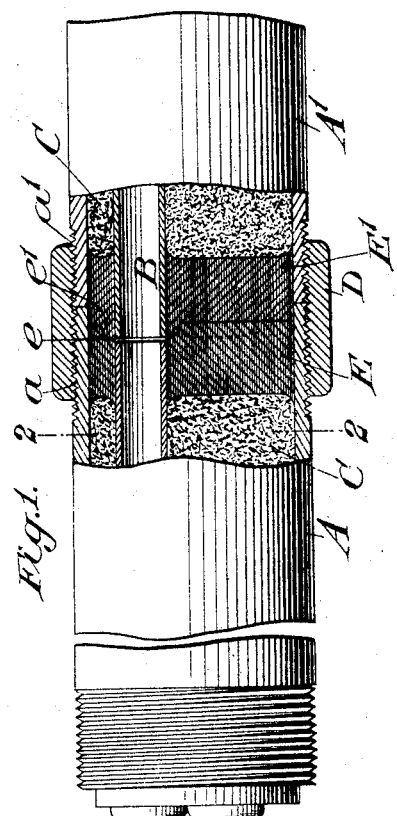
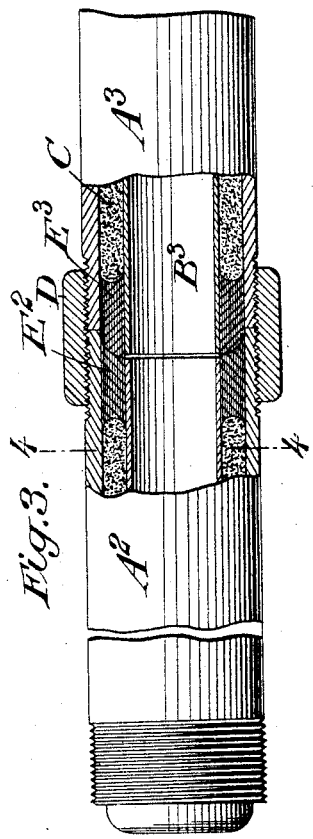
Witnesses:-
George Barry Jr.
Edward Quser
Inventor:-
John H. Bleoo
By Brown & Deward
his Attorneys.

UNITED STATES PATENT OFFICE.

JOHN H. BLEOO, OF BROOKLYN, NEW YORK, ASSIGNOR TO THE AMERICAN SILEX COMPANY, OF NEW YORK, N. Y.

RACEWAY FOR ELECTRICAL CONDUCTORS.

SPECIFICATION forming part of Letters Patent No. 586,282, dated July 13, 1897.

Application filed April 13, 1897. Serial No. 631,959. (No model.)

*To all whom it may concern:*

Be it known that I, JOHN H. BLEOO, of Brooklyn, in the county of Kings and State of New York, have invented a new and useful Improvement in Raceways for Electric Conductors, of which the following is a specification.

My invention relates to an improvement in raceways for electric conduits, with the particular object in view of providing a metallic raceway for the reception of either bare or insulated wires or conductors, as may be found desirable.

It has been found by careful experiment that pure silex possesses as an insulator those qualities which answer the requirements of laws and rules adopted in our great cities and towns as a safeguard against fire from electric currents. With little or no tendency to absorb moisture, a non-conductor of heat, and fusible only at 12,000° Fahrenheit or thereabout, and at the same time a perfect non-conductor of electricity, it follows that an electric wire securely embedded in silex is safely insulated.

In wiring houses and in running conductors to accommodate the various demands it becomes of great importance that the insulator shall be in the nature of a raceway, through which the conducting-wire may be drawn at pleasure, and the greater the freedom with which the wire may be drawn the more desirable the raceway, provided the insulation be perfect.

My present invention consists, broadly, in a metallic raceway suitably insulated from surrounding objects and more specifically in the structure of the pipe or conduit and nature of the insulating material for holding one or more of the metallic raceways in position to receive the conducting wire or wires.

A practical embodiment of my invention is represented in the accompanying drawings, in which—

Figure 1 is a view in side elevation, partly in section, of a pipe or conduit with a plurality of metallic raceways supported therein. Fig. 2 is a transverse section of the same in the plane of the line 2 2 of Fig. 1. Fig. 3 is a view in side elevation, partly in section, of a pipe or conduit with a single raceway supported therein; and Fig. 4 is a transverse section through the same in the plane of line 4 4 of Fig. 3.

Referring to the structure shown in Figs. 1 and 2, A and A' represent two consecutive sections of a pipe or conduit within which a plurality of metallic raceways, in the present instance three metallic raceways, (denoted, respectively, by B, B', and $B^2$,) are supported and insulated from one another and from the wall of the pipe or conduit by a packing of finely subdivided or powdered silex, (denoted by C.) The pipe or conduit sections may be of any suitable length or diameter as the particular purpose for which they are used may demand and may be made of any suitable material—such, for example, as iron. For purposes of connecting them to form a continuous conduit I find it convenient to provide their adjacents ends the one with a right-hand screw-thread $a$ and the other with a left-hand screw-thread $a'$, adapted to register with the interior screw-thread on a coupling-nut D, by the rotation of which the ends of the conduit-sections may be drawn into close contact.

The metallic raceways B B' $B^2$ may be of any suitable size to accommodate the conductor to be drawn through them and may consist of brass or other suitable metal, preferably a metal which is capable of being bent without liability of breaking, to accommodate the manipulation of the pipe or conduit within which they are located when said pipe or conduit is utilized in connection with wiring a house or in other positions where it is desirable to bend it at various angles.

The raceways are in practice made in sections of lengths substantially corresponding to the lengths of the sections of the pipe or conduit within which they are located and are packed at suitable distances apart from one another and apart from the interior wall of the pipe or conduit by means of the powdered silex.

At the ends of the adjacent sections of the conduit I provide wads or stops of mica, (denoted in Fig. 1 by E and E',) the said wads of mica being crowded snugly around the ends of the raceways and between the raceways and the interior walls of the conduit and provided with correspondingly receding and projecting portions at the adjacent ends of each of the raceways for the purpose of breaking joint and causing the adjacent faces of the wads to tightly impinge against each other when the ends of the conduit-sections are forced toward each other. In the present instance I have shown receding portions in the face of the wad E, such portions being denoted by $e$, and correspondingly-projecting portions on the face of the wad E', said projecting portions being denoted by $e'$. The raceways in the section A terminate at the bottoms of the recesses $e$ and those in the conduit-section A' at the tops of the projections $e'$, so that when the conduit-sections are brought together the raceway-sections will have their ends in proximity to each other, it being immaterial whether they actually contact or not. To further break joint and prevent any possible entrance of water to the interior of the conduit I find it desirable to stop the outer portion of the wad E a little short of the end of the conduit-section and extend the wad E' a little beyond the end of its conduit-section. The metallic raceways B, B', and $B^2$ when thus embedded and held in alinement by the connection of the pipe or conduit sections may or may not become a part of the electric conductor, depending upon the following conditions: If the conducting-wire which passes through them be a bare wire and the ends of the raceway-sections are in contact, then the metallic raceway becomes a part of the electric conductor; but if the ends of the raceway-sections do not contact then the raceway-sections will, as a matter of course, cease to become a continuous conductor, as the spaces between their ends must be bridged by the conducting-wire alone. If, on the other hand, the conducting-wire which is passed through the raceways be an insulated wire, then the raceways will of course form no part of the conductor, but in addition to forming a smooth passage-way for drawing the electric conductor into position they will serve to protect the wire from all harm, and in the event of any imperfection in the insulation of the wire there will be no harm arising from its contact with the interior wall of the metallic raceway, as it is itself completely and effectually insulated and guarded from any liability of becoming injured or rendered inoperative by the proximity of heat.

In the form shown in Figs. 3 and 4 a single metallic raceway $B^3$ is located within a bed of powdered silex C, packed between its exterior wall and the inner wall of the pipe or conduit sections $A^2 A^3$. In this instance, as in that already described, the pipe-sections are drawn together by a nut and the adjacent ends of the metallic raceway $B^3$ are surrounded by wads of mica, (denoted by $E^2 E^3$,) arranged to break joints with the adjacent ends of the conduit-sections.

It is obvious that slight changes might be resorted to in form and arrangement of the several parts without departing from the spirit and scope of my invention. Hence I do not wish to limit myself strictly to the structure herein shown and described; but

What I claim is—

1. A raceway for the reception of a bare electric wire, the said raceway having an exposed inner metallic surface and capable of being bent, in combination with means for insulating the raceway from surrounding objects, substantially as set forth.

2. A metallic raceway for the reception of an electric wire, in combination with a pipe surrounding the said raceway and an interposed layer of insulating material between the raceway and pipe, the said insulating material consisting of granules or particles free to move relatively to one another to adjust themselves to any bending of the raceway and pipe, to keep the insulating-layer intact, substantially as set forth.

3. A raceway for the reception of a bare electric wire, the said raceway having an exposed inner metallic surface, in combination with a pipe surrounding the raceway and a layer of substantially pure powdered silex packed between the raceway and surrounding pipe, substantially as set forth.

4. In combination, a plurality of pipe or conduit sections, metallic raceways for electric conductors located within said pipe or conduit sections, an insulating-packing intermediate of the raceways and the interior walls of the conduit-sections, wads of mica located at the adjacent ends of consecutive pipe or conduit sections and means for holding the ends of the pipe or conduit sections in close contact, substantially as set forth.

5. A plurality of pipe or conduit sections, means for insulating electric conductors from the interior walls of the sections, wads of mica fitted in the ends of adjacent sections and provided with corresponding receding and projecting portions on their adjacent faces and means for drawing the adjacent faces of the mica wads into close contact, substantially as set forth.

JOHN H. BLEOO.

Witnesses:
 FREDK. HAYNES,
 C. S. SUNDGREN.